United States Patent [19]

Zimmermann

[11] 4,306,492
[45] Dec. 22, 1981

[54] APPARATUS FOR MAKING A COFFEE BEVERAGE

[76] Inventor: Jürgen Zimmermann, Mulle 5, 3321 Salzgitter, Fed. Rep. of Germany

[21] Appl. No.: 60,385

[22] Filed: Jul. 25, 1979

Related U.S. Application Data

[62] Division of Ser. No. 893,507, Apr. 4, 1978, Pat. No. 4,211,156.

[30] Foreign Application Priority Data

Apr. 7, 1977 [DE] Fed. Rep. of Germany ....... 2715582

[51] Int. Cl.³ .............................................. A47J 31/00
[52] U.S. Cl. ....................................... 99/287; 99/323; 206/217; 426/80
[58] Field of Search .......................... 206/0.5, 217, 218; 426/77–84, 86, 433; 99/306, 287, 323, 295, 297; 366/256, 267, 268, 269, 343

[56] References Cited

U.S. PATENT DOCUMENTS 1,709,168  4/1929  Epperson ............................. 99/295
3,935,318  1/1976  Mihailide ............................. 99/297
4,033,453  7/1977  Giaimo ................................. 426/85

FOREIGN PATENT DOCUMENTS 1404125  10/1958  Fed. Rep. of Germany .
1955585   8/1966  Fed. Rep. of Germany .
1103646  11/1955  France .
1089220   3/1958  France .
 304115   6/1921  United Kingdom .
 412097   6/1934  United Kingdom .
 905009   9/1962  United Kingdom .
 927376   5/1963  United Kingdom .
1220343   1/1971  United Kingdom .
1382896   2/1975  United Kingdom .
1436397   5/1976  United Kingdom .

*Primary Examiner*—Billy J. Wilhite

[57] ABSTRACT

Apparatus for enclosing a filter bag, filled with a portion of coffee provided with a cup, a bellows member formed beneath the cup and separated by a perforated wall, the coffee portion being inserted within the bellows.

4 Claims, 7 Drawing Figures

U.S. Patent  Dec. 22, 1981  4,306,492
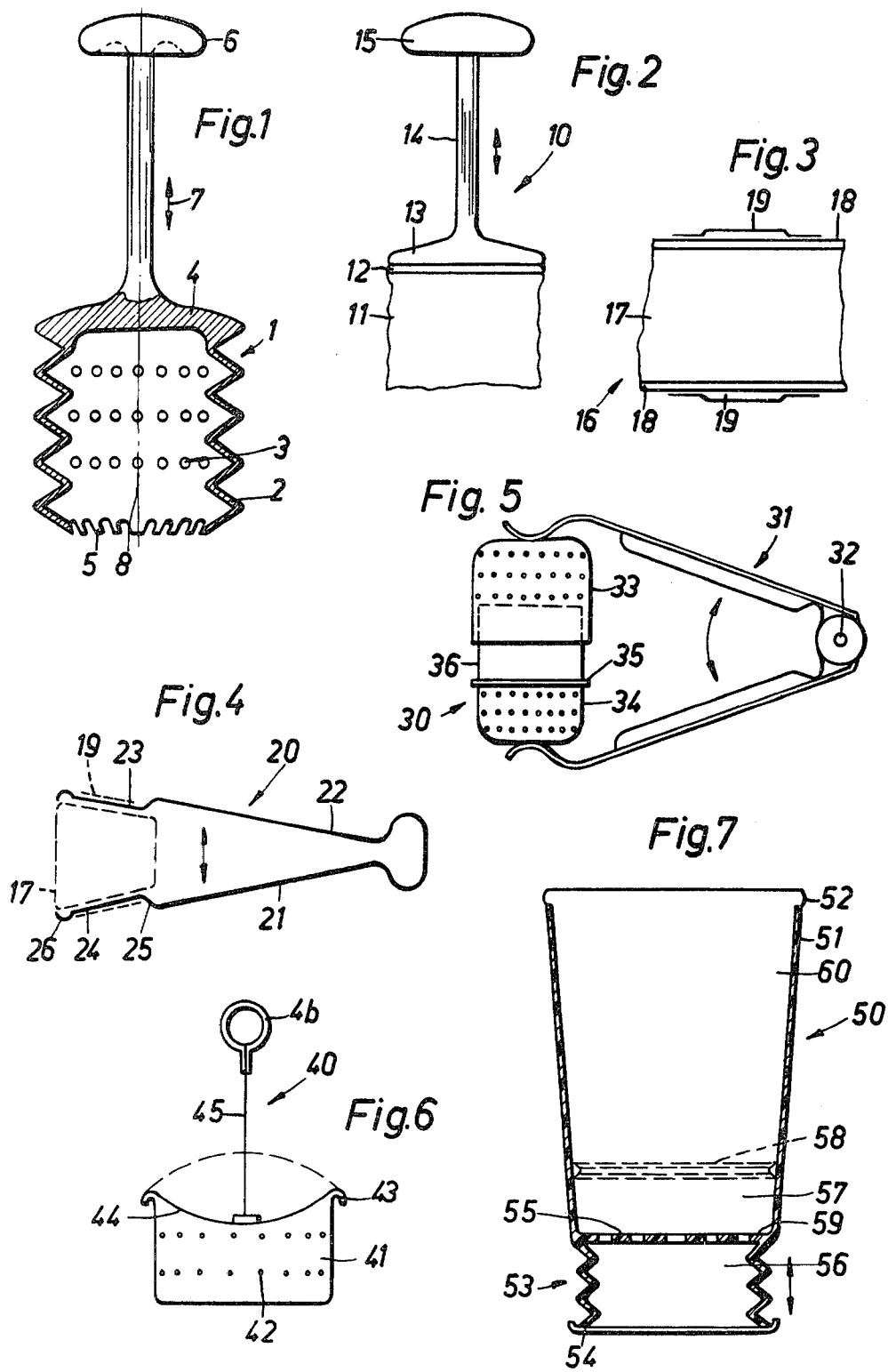

APPARATUS FOR MAKING A COFFEE BEVERAGE

This is a divisional application of Ser. No. 893,507, filed Apr. 4, 1978, now U.S. Pat. No. 4,211,156.

The invention concerns apparatus for producing a beverage from ground coffee beans.

Soluble types of coffee are widely used, but a ready-to-drink coffee beverage can only be obtained by pouring water onto a highly refined powder.

It is customary in the production of tea to fill tea portions into finished filter bags in the factory, so that the user of such a tea bag either hangs it into a glass of hot water or pours hot or boiling water over it to obtain a finished tea beverage. As a rule it requires only a sufficiently long contact time between the tea mixture contained in the filter bag and the water to dissolve the desired substances out of the tea leaves. The process can be accelerated by stirring or by moving the tea bag repeatedly up and down on the thread on which the tea bag is suspended.

The production of a coffee beverage from ground coffee beans is possible by forming a coffee powder and either by filling the coffee powder into a pitcher and pouring boiling water over it, letting the coffee brew for a while, or by filling the coffee powder into a coffee filter and pouring the boiling water into the filter through which the water flows off in a relatively small amount into a vessel underneath.

The present invention provides apparatus by means of which a cup of coffee can be produced in a simple manner with measured amounts of ground coffee powder.

This problem is solved according to the present invention by inserting a measured amount of dry coffee powder in a closed chamber bounded partly by filter material, dipping this chamber into a portion of hot water, and producing in the hot water portion a pump-like current traversing the chamber below the water level. For the production of the pump-like current, the volume of the closed chamber can be alternately increased and decreased.

The invention provides a container in which a closed filter bag, filled with a portion of coffee powder, is received, the container is provided with at least one moving wall and a handle for producing a pump-like action driving a current of water transversely through the filter bag.

It was found in practice that if coffee powder is merely filled into a bag and subsequently placed into a portion of hot water, or if hot water is then poured over such a bag in the manner of a conventional tea bag, no drinkable coffee beverage is obtained. There is in practice a certain coloring of the water, but no extraction of the components constituting the coffee beverage from the coffee powder contained in the filter bag.

On the other hand, by exposing the coffee powder for a certain period of time to a pump-like current vigorously traversing the powder it is possible to dissolve from the coffee powder the flavor and color substances and components necessary for the preparation of a true coffe beverage and to distribute these substances in the water portion so that a strong beverage with a pleasant aroma is obtained in a short time.

The apparatus can be used in households, restaurants, canteens, offices, etc.

Thus the container can have a fixed wall which is provided on one side with a handle and on the other side with a movable holder also having a fixed wall for the filter bag. Such a device can be inserted directly in a vessel filled with water, e.g. a drinking cup, and by moving the handle relative to a wall supporting the filter bag at its free end be made to act in such a way that the filter bag arranged between the fixed wall of the vessel and the fixed wall of the device is alternately compressed and expanded so that the filter bag is constantly traversed in opposite directions by an alternating water current. This current rapidly dissolves the components, important for the beverage, out of the coffee powder, so that a finished beverage is obtained in a few seconds, and is ready to drink after the device with the filter bag has been removed. Depending on the vigor and duration of movement of the device, the user can himself control the strength of the coffee beverage, with the single portion contained in the filter bag remaining unchanged.

Of particular advantage is a device where the coffee powder portion and the pumping device are a part of a drinking cup, particularly a disposable cup. The filter bag, can be filled into the pumping device in the factory or subsequently inserted in a predetermined position. The aroma-proof and sanitary packaging of the coffee presents no problem. Such a prepared cup can be used, for example, in vending machines. If the filter bag is inserted in the factory, it is only necessary thereafter to heat and dispense a portion of hot water. This presents no problem at all. Preferably the drinking cup has to this end a deformable bellow-shaped section, preferably a deformable bottom, so that, after the water has been filled, the coffee beverage is readied to drink by pushing down repeatedly the body of the cup to change the volume of the deformable bottom section.

The invention will be described below more fully in several embodiments on the basis of the attached drawings.

FIG. 1 is a vertical section of a device for producing a beverage;

FIG. 2 is a simplified sketch of another such device;

FIG. 3 is a view of a filter bag in a form prepared in the factory for use together with the device shown in FIG. 4;

FIG. 4 is a view of a pumping device;

FIG. 5 is a view showing a modified embodiment of the device according to FIG. 4;

FIG. 6 is a view of another simple pumping device; and

FIG. 7 is a view of the pumping device according to the invention in the form of a drinking cup.

The essential feature of the present invention consists in that a predetermined portion of coffee powder is enclosed preferably in the factory in a filter bag, which consists of a water-permeable flexible material that can be stressed mechanically at least to a certain extent. The bag may be sealed in an aroma tight, e.g. plastic outer bag. For preparing a coffee beverage, this filter bag is brought into a vessel with a portion of hot, practically boiling water, after removing or loosening the aroma-tight container. Simply bringing the coffee bag in contact with the hot water, shows no results. Even after prolonged standing there is only a slight coloration of the water, but no coffee beverage is produced.

According to the present invention, a current of a certain type is produced in the water after introducing the portion of coffee powder into the water in such a way that this current vigorously traverses, preferably alternately, the amount of coffee powder enclosed in the filter bag. Surprisingly it was found that, after the portion had been subjected for a short time to a current of this type, all substances necessary for the production of a drinkable coffee beverage have been transferred into the water portion, so that the filter bag with the coffee powder can now be removed from the water, and the beverage is ready to drink. Conventional coffee powder now available can be used in the practice of this invention, the nature of the coffee powder itself is not critical, since the benefits and objectives of the present invention lie in the pumping of the water through the powder.

The vogorous alternating flow of the water in the coffee powder portion can be produced in various ways.

FIG. 1 shows a device which can be manufactured simply and cheaply, for example, from plastic. The device 1 has a disk-shaped or plate-shaped center plate 4 on one side of which is formed a stem-like handle 6, and on the other side a tubular bellows 2, which is flexible in the direction of its central axis. The end remote from plate 4 is open and has tongue-type teeth or fingers 5, inclined toward the inside slightly away from plate 4. In a vessel such as a cup into which the device is inserted, these teeth 5 form a support, e.g. against the bottom of the vessel. At the same time these fingers 5 define with the bellow walls 2, on the one hand, an inner space 8 for receiving a filter bag (not shown) and, on the other hand, an inlet opening for the filter bag provided. Bellows 2 is provided with holes or perforations 3, preferably along the radial outside folding lines.

After inserting the filter coffee bag into the interior of the bellows, the device can be sealed in a plastic package. In use the plastic package is removed and the finger-shaped bottom edge is placed on the bottom of a drinking cup filled with hot water. The handle 6 to which the plate-shaped center part 4 is attached is moved up and down in the direction of the double arrow 7. The volume of the interior chamber 8 in which the filter bag is arranged, is thus alternately reduced and increased, so that a strong pump-like current is forced to flow radially through the interior of the device and thus through the filter bag.

The device shown in FIG. 2 is a simplified form of the device according to FIG. 1. The device 10 also has a plate 13 with a stem 14 and a handle 15. However on the underside of plate 13 there is secured, by means of fastening device 12, a freely suspended filter bag 11 with the portion of coffee powder inserted therein. The device can be prefabricated in the factory in the represented form and can be provided with an aroma-proof plastic wrapping cover. After removing the wrapping, the arrangement is dipped into a vessel filled with hot water and, when it rests on the bottom of the vessel, the volume of filter bag 11 is constantly increased and decreased by moving handle 15 up and down, so that the interior of the filter bag, and thus the portion of coffee powder is subjected to a strong pump-like current. The filter bag is sufficiently rugged to withstand the pumping movements of the handle.

Instead of interacting with the bottom of the vessel, the device can also interact with the inner wall of the vessel by placing the device on the edge of the container and subjecting the filter bag arranged between an abutment surface and the inner face of the container to an alternating stress in order to change the volume. The filter bag may be made of conventional filter paper, or perforated plastic, of a thickness determined by those skilled in the art to withstand reasonable force necessary to the pumping action. The fastener 12 may be an elastic rubberband or string tie.

Similar in its action is the device according to FIGS. 3 and 4. FIG. 4 shows a tong-type mechanism 20 which can be made of metal or plastic, and which has at the closed end a bent spring clip from which emerge the two tong arms 21 and 22. These have at their free ends opposing bearing plates 23 and 24. Between the two bearing plates 23 and 24 is inserted a filter bag 16, as shown in FIG. 3. The filter bag consists of a tubular filter jacket 17 having two relatively rigid end plates 18 on the exterior of which is arranged a loop 19 for the passage of the free ends of the tong arms 21 and 22. Corresponding deformations 25 and 26 on the arms of the tong ensure a sufficiently strong anchorage for filter bag 16. By moving tong arms 21 and 22 alternately close to and away from each other, the volume of the filter bag 16 can be decreased and increased, so that a vigorous pump-like current is produced in the filter bag during this movement under the level of a hot water bath, which has the above described effect.

A similar device is shown in FIG. 5. Here the two arms 31 of a tong-type device 30 are pivotally jointed at 32, and a spreading spring (not shown) is arranged at junction 32 ensuring that the tong-type device is normally in the represented spread position. The tongs can be opened beyond the spread position, so that a filter container having two telescopic parts 33 and 34, respectively secured at the free ends of arms 31, can be pulled apart completely. A filter bag with a measured coffee portion can be placed into the interior of the space formed by the two telescopic parts 33 and 34. One or both parts 33 and 34 have in their wall, bores or perforations. A collar 35 on part 34 can limit the relative movement of the parts in the direction toward each other, so that the extension 36 of part 34, which telescopes into part 33 can be predetermined and ensures that the filter bag inserted into the container is not damaged by the pressure of the tongs.

The container shown in FIG. 6 is a readily disposable device. It has a relatively rigid cup-shaped portion 41 with perforations 42 into which a filter bag with a coffee powder portion is inserted in the factory. The cup is secured on the open side with its edge 43 by a flexible diaphragm 44, welded-on or fastened in any other way. In the middle of the diaphragm is secured one end of a relatively rigid control element 45, which has at the other end a gripping ring 46. By pumping the diaphragm between the position shown in solid lines and the position shown in broken lines, it is possible to produce a vigorous alternating current in cup 41 which is caused by the alternating change in volume of the cup.

While the devices shown in FIGS. 1 to 6 are used in connection with a separate vessel such as a cup which receives the water portion, FIG. 7 shows a device which is designed initially as a drinking cup which can itself be filled with hot water.

The cup 50, shown in FIG. 7, can be made of impregnated or laminated paper pulp or plastic, and is designed preferably to be disposable. The cup has a conventional shell 51 tapering slightly downward with a reinforced drinking edge 52. To the narrower bottom end there is provided a bellow-type section 53 which is axially deformable in the direction of the cup axis. Preferably, the bellows is molded with the cup although it can be secured thereto unitarily afterwards. The bellows is sealed by a bottom wall 54 to define a chamber 56 which can be changed in volume in opposite directions when the cup is grasped at the upper body part 51 and by exercizing an alternating pressure acting in the direction of the axis of the cup. Chamber 56 can be provided in the factory with the filter coffee bag prior to the integration of the bellows or the closing of the bottom wall 54 about the rim of the bellows.

In order to protect the filter bag, a perforated partition 55 separates the chamber 56 from the water cup 51. This can also, however, fail and the edge thereof is provided with a rim 59 which acts to limit the pumping movement of the bellows. An annular rim-like holder 58 is arranged at an axial distance above the bellows portion 53 so that a partial space 57 is formed also acting to limit the pumping movement. In addition, a correspondingly shaped filter can be inserted in the cup within the space 57 or a perforated wall filter can be snapped into place at the level of the holder 58 without extra fastening means. In the latter case, a particular vigorous flow is achieved in the filter bag with a rhythmic deformation of the bellow 53 even without a direct pumping action on the filter bag.

I claim:

1. Apparatus for the production of a coffee beverage from dry coffee powder contained in a filter bag comprising a drinking cup having an upper edge, a generally cylindrical wall and a closed bottom, and a perforated partition extending transversely within said cup to form an intermediate horizontal wall spaced above the bottom of said cup, said intermediate wall and the bottom of said cup defining a chamber adapted to contain the filter bag, said chamber being surrounded by a substantially cylindrical wall portion, said cylindrical wall portion being corrugated along circumferential fold lines to form a bellows permitting the bottom to be pumped relative to the intermediate wall, whereby on filling said cup with water, and pumping said bottom wall water is caused to flow in a current through said intermediate wall and through said filter bag.

2. Apparatus according to claim 1, including a pair of rim holder elements provided on the interior of said drinking cup above said intermediate wall, said rim holders being adapted to cooperate with a filter bag to position same within the drinking cup.

3. The apparatus according to claim 1 or 2, wherein said drinking cup is formed of material sufficiently rigid to enable formation of said corrugations and withstand pumping.

4. The apparatus according to claim 3, wherein said material is plastic.

* * * * *